United States Patent [19]
Ostroff

[11] 4,395,742
[45] Jul. 26, 1983

[54] HOME APPARATUS

[75] Inventor: Arthur Ostroff, Woodland Hills, Minn.

[73] Assignee: Minnesota Mining and Manufacturing Company, Saint Paul, Minn.

[21] Appl. No.: 197,136

[22] Filed: Oct. 15, 1980

[51] Int. Cl.³ .............................................. G11B 21/08
[52] U.S. Cl. ...................................................... 360/78
[58] Field of Search ..................................... 360/75, 78

[56] References Cited

U.S. PATENT DOCUMENTS

| | | | |
|---|---|---|---|
| 3,706,857 | 12/1972 | Lynott | 360/78 |
| 3,860,958 | 1/1975 | Hanson | 360/57 |
| 3,956,766 | 5/1976 | Hanson et al. | 360/78 |
| 4,194,226 | 3/1980 | Kaseta et al. | 360/78 |

FOREIGN PATENT DOCUMENTS

54-58010 7/1979 Japan .

Primary Examiner—Robert S. Tupper
Attorney, Agent, or Firm—Cruzan Alexander; Donald M. Sell; William D. Bauer

[57] ABSTRACT

An initialization apparatus for a signal reproducing apparatus having a transducer scanning a plurality of record tracks on a record medium where the position of the transducer is controlled by a stepper motor having fewer steps than the number of record tracks required to be covered. A physical stop is provided the transducer near a selected "home" record track at one edge of the plurality of record tracks. A current selector supplies the phase windings of the stepper motor with a reduced amplitude current during an initialization position. This enables a transducer controller to stop the stepper through a sequence of steps under reduced current to the phase windings of the stepper until the physical stop is contacted, thus ensuring knowledge of the initialization of the transducer at the "home" record track.

9 Claims, 5 Drawing Figures

HOME APPARATUS

BACKGROUND OF THE INVENTION

The present invention relates generally to a signal reproducing apparatus and relates more particularly to the initialization of a signal reproducing apparatus employing multiple tracks utilizing a stepper motor for moving a transducer from selected track to selected track. Several different types of signal reproducing apparatus presently exist in the prior art. Many of the signal reproducing apparatus utilize a magnetic storage media. One example of a signal reproducing apparatus is a disk drive. Some disk drives utilize a plurality of record tracks per record surface available. Such disk drives may have a single platter with a record surface on one or both sides of the platter or it may employ a plurality of platters employing multiple record surfaces with at least one transducer per record surface and in some cases utilizing a plurality of transducers per single record surface. Another example of a signal reproducing apparatus is that of magnetic tape drives. Again, many of these magnetic tape drives utilize a plurality of record tracks. Still further some of these magnetic tape drives utilizing a plurality of record tracks require that a transducer be moved transverse to the direction of tape movement for the purpose of selecting a particular record track. Still another example of a signal reproducing apparatus employing magnetic media is that of the rotating magnetic drum. Again a magnetic drum may have a plurality of tracks and may have one or more transducers, each of which is responsible for covering a plurality of record tracks on the drum surface. In general, the apparatus of the present invention may be utilized most favorably in conjunction with a signal reproducing apparatus utilizing a magnetic record media having multiple tracks where it is necessary and required that a transducer be moved relative to the record media for the purpose of selecting a particular record track.

When a transducer must be moved relative to a record track, a means of controlling that transducer with respect to the multiple tracks must be achieved. Several methods are used to accomplish this result. One of the simplest examples of moving a transducer relative to a record track involves the use of magnetic tape which has multiple tracks which are offset with respect to the center line of the magnetic tape. The transducer or transducers are then fixed relative to the tape width, and the transducer is moved relative to the record tracks merely by turning the magnetic tape over.

Stepper motors have also been utilized to control transducers with respect to a plurality of record tracks. When the number of record tracks exceeds the number of finite current programs available for the phase windings of the stepper motor, a means is needed for determining the position of the transducer with respect to those record tracks. The device controlling and instructing the stepper motor is able to determine the particular current program currently being applied to the phase windings of the stepper motor, but since there exist more record tracks than finite current programs of the stepper motor, the same current program is utilized repeatedly for more than one record track. One means of maintaining the positional control over the transducer is to utilize multiple transducers controlled by a single stepper motor. The number of transducers is increased to the point where the number of record tracks served by a single transducer is not greater than the number of finite current programs available to the stepper motor then the positioning problems are solved. Still another means is to dedicate one record surface, e.g., one side of a disk platter, to prior encoded data which would identify the particular record track being serviced. Multiple transducers then serving other record services would be mechanically affixed and positioned with respect to the transducer serving the dedicated surface so that the record track being serviced would be readily identifiable. This means, however, is quite wasteful since an entire record surface must be dedicated to the track location information. For example, in a two disk system utilizing four record surfaces, 25% of the usable record media would be wasted due to the necessity of maintaining transducer position information.

However, if the stepper motor was, at start-up, initialized with respect to the record tracks being serviced, then the external device servicing and controlling the transducers and determining which record of track the transducers should service could then keep track of subsequent transducer movement and by updating the position could maintain knowledge of the present position of the transducer or transducers. Such external device is defined as a transducer controller. Such a device is defined as that device which decides and determines which record track the transducer or transducers are to select and to provide the particular current program to be supplied to the phase windings of the stepper motor and to sequence that current program in the phase windings in order to effectively move the stepper motor through a plurality of steps, if necessary, to reach the selected track. Such transducer controllers are well known in the art.

For a specific example, assume that a signal reproducing apparatus has one record media surface. The apparatus has at least one transducer which covers 360 record tracks. Assume that a stepper motor having 8 finite current program states for its phase windings is responsible for controlling the transducer covering those 360 tracks. To illustrate the 8 particular finite current programs, assume that the stepper motor has two phase windings, and also assume that there exist three states for the current in each phase winding. There would then exist three squared, or nine, correct programs for the stepper motor, however, one of those current programs; namely, the one in which zero current is present in each phase winding is a non-preferred step. This current program is therefore eliminated resulting in the stepper motor having 8 finite current programs. In order to cover the 360 record tracks, the stepper motor could go through the 8-step sequence 45 times. When power is initially applied to the signal reproducing apparatus, the transducer controller could supply a particular current program to the stepper motor. The transducer controller would then know which particular step the stepper motor is at but not which of the 45 sequences at which the transducer is located. That is, assume that the transducer controller supplies the current program corresponding to step 8 of the stepper motor, the transducer controller knows that the stepper motor is at step 8 but does not know if the transducer is on track 8, 16, 32 . . . 352 or 360.

However, if the transducer could be initialized so that the transducer controller would know which of the 45 sequences at which the transducer was located then the transducer controlled could then keep track of any subsequent position of the transducer by merely adding and subtracting the record track movement of the transducer. In fact, the transducer controller actually controls the record track movement of the transducer since it (a) should know the current position of the transducer with respect to the record tracks, (b) receives instructions as to the new selected record track to be serviced, (c) by subtracting determines the number of tracks through which the transducer must be moved, and (d) sends a sequence of current programs to the phase windings of the stepper motor to enable the stepper motor to progress in a proper direction a proper number of steps to achieve the new selected record track.

SUMMARY OF THE INVENTION

The present invention involves a signal reproducing apparatus of the type wherein at least one transducer scans a selected one of a plurality of parallel tracks on a record medium on which signals may be recorded. The signal reproducing apparatus has a stepper motor which is used to control the position of the transducer with respect to the plurality of parallel tracks. Further, the stepper motor has a plurality of windings with each step of the stepper motor being defined by a particular current present in each of the plurality of windings. The number of plurality of parallel tracks exceeds the number of the particular steps of the stepper motor. A controller controls the movement of the transducer relative to the plurality of parallel tracks by moving the transducer a selected number of tracks by providing a sequence of currents to the plurality of windings to effect a movement in the stepper motor. A physical stop is positioned near one of the plurality of parallel tracks designated a home track with the physical stop being utilized to restrict the movement of the transducer from moving substantially beyond the home track. A current selector is coupled between the control means and the plurality of windings for selecting either a set of high amplitude currents or a set of low amplitude currents to the plurality of windings. In this manner, the position of the transducer may be initialized at the home track by stepping the stepper motor at least the number of the plurality of the parallel tracks with said set of low amplitude currents, and by ending the stepping of said stepper motor with the particular current present in the windings associated with the particular step of the stepper motor associated with the home track.

The present invention is particularly useful where the parallel tracks are circular to geometry. The home track may be located at one edge of the plurality of parallel tracks, i.e., either the inside or the outside.

In a preferred embodiment, the current selecter has a control latch having a plurality of bit positions for storing stepper motor current control commands from the transducer controller to the stepper motor and having at least one bit position adapted to hold an initialize command. An analog multiplexer having an output coupled to the stepper motor, having a first set of data inputs each coupled to a selected control voltage for producing the set of high amplitude currents and a second set of data inputs each coupled to a selected control voltage for producing the set of low amplitude currents, and having a set of selection inputs for selecting either one of the first set of data inputs or one of the second set of data inputs is also utilized. The set of selection inputs is coupled to the control latch such that when the control latch holds the initialize command that the second set of data inputs is selected. In this manner, the set of low amplitude currents may be selected when the bit position of the latch holds the initialized command.

The control voltages may be provided by a set of voltage division resistors coupled between either of two voltage sources and a ground potential. Still further, a resistor may be coupled in series between the output of the analog multiplexer and the stepper motor, an offset latch having a plurality of bit positions each having an output coupled through an offset resistor to the stepper motor for controlling the stepper motor position by an appropriate offset determined by the contents of the plurality of bit positions may then be utilized. With a bias resistor coupled from the stepper motor to a voltage source for providing bias to the offset resistors. The offset resistors may differ in value from each other by multiples of two.

In a preferred embodiment, the transducer is mounted on a moveable arm with the stepper motor coupled to the moveable arm. The physical stop then limits the movement of the moveable arm such that when the moveable arm contacts the physical stop that the transducer is positioned approximately over the home track.

A set of low amplitude currents can be supplied as the current program to the phase windings of the stepper motor during the initialization process because speed and accuracy is not important. Normally, when the transducer is being moved from a first selected track to a second selected track, speed and accuracy is of the utmost importance. It is important that the newly selected track be obtained as quickly and accurately as possible so that record data may be read from or stored in the record track. However, during the initialization period, it is desired only that the transducer be positioned roughly in relation to a selected home track since it is only necessary that the transducer be located within the particular sequence of the number of finite steps of the stepper motor. Speed is not important during initialization, because initialization is only required when power is initially applied to the signal reproducing apparatus. Since this normally occurs rather infrequently, the speed at which the initialization process is obtained is relatively insignificant.

A significant advantage is gained from the initialization process to the home track utilizing the physical stop and the low amplitude currents. Once the position of the transducer is located at the selected home track, the transducer controller may then initialize its control circuits and "know" that the transducer is located at this particular record track. Any further position of the transducer with respect to the record tracks can be readily taken care of within the transducer controller's control circuitry. It is not necessary that an entire record surface and a transducer be dedicated for the purpose of initializing and maintaining the position of the transducers utilized for reading and storing with respect to the record tracks.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENTS

The initialization apparatus of the present invention may be utilized in different types of signal reproducing apparatus in which at least one transducer is utilized for a plurality of record tracks, where a stepper motor controls the movement of the transducer with respect to the record tracks and where the number of record tracks exceeds the number of finite current programs available to the stepper motor. The apparatus of the present invention will be illustrated in a disk drive environment. The transducer will be illustrated coupled to a moveable arm, a stepper motor controlling the movement of the arm; however, it is understood that the initialization apparatus of the present invention is equally applicable to other types of signal reproducing apparatus utilizing other transducer movement configurations and utilizing other magnetic media, such as, but not limited to, magnetic tape and magnetic drum.

The transducer controller responsible for controlling the stepper motor and supplying the stepper motor with a sequence of current programs to control its movement from one selected track to a second selected track is well known in the art. The particular transducer controller and the exact sequence of current programs supplied by the transducer controller are beyond the scope of the present invention. The present invention is limited in scope to the apparatus controlled by the transducer controller and which will enable the transducer controller to perform an initialization procedure.

The principal responsibility of the transducer controller is to perform the following steps after it senses that power has initially been applied the disk drive or whenever the transducer controller desires the initialize the position of the transducer. First, the transducer controller should change to the current programs which will operate at reduced power. The transducer controller should then supply the sequence of current programs to the disk file to move the stepper motor a number of tracks toward the direction the physical stop at least the total number of tracks serviced by the transducer. It is preferable that the number of tracks moved is equal to the total number of tracks serviced plus the number of tracks traversed during one complete cycle of current programs of the stepper motor. This will ensure that the physical stop will be encountered. The transducer controller then ends the supplying of current programs with the particular current program associated with the selected "home" track. The transducer controller may then change back to its normal power set of current programs and control the transducer in its normal manner knowing its initial position.

Figure 1:
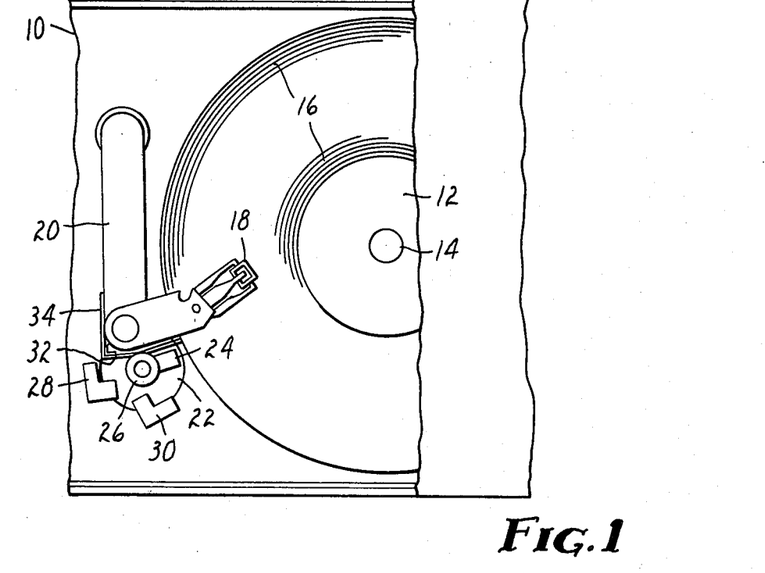
FIG. 1 illustrates a signal reproducing apparatus before initialization.

FIG. 1 illustrates a portion of a signal reproducing apparatus 10 employing a disk 12 as a record media. The disk 12 rotates around a shaft 14 and has contained upon its surface a plurality of record tracks 16. A transducer 18 is held by a moveable arm 20 controlled by a stepper motor 22. The stepper motor 22 contains a projection 24 which projects radially from the shaft 26 of the stepper motor 22. Physical stops 28 and 30 are positioned relative to the axis of the stepper motor 22 to contact projection 24 when the stepper motor 22 has moved to a predetermined maximum movement in one direction or the other. Outward stop 28 contacts projection 24 when the transducer 18 has moved to the outermost of the record tracks 16, and inward stop 30 contacts projection 24 when the transducer 18 has moved to or past the innermost of record tracks 16. In FIG. 1 transducer 18 is illustrated as being located on an indeterminant record track 16 somewhere between the innermost record track and the outermost record track. With the transducer so located the projection 24 is similarly located between outward physical stop 28 and inward physical stop 30.

The position of transducer 18 relative to the record tracks 16 is indicative of an exemplary position of the transducer 18 when power is initially applied to the signal reproducing apparatus 10. The transducer controller (not shown) does not know which of the record tracks 16 the transducer 18 is positioned.

Figure 2:
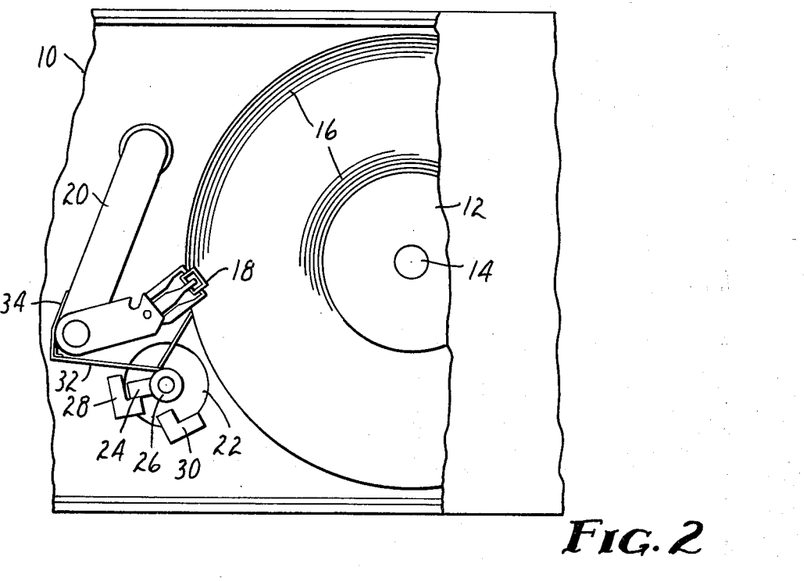
FIG. 2 illustrates a signal reproducing apparatus after initialization.

FIG. 2 illustrates the same signal reproducing apparatus 10 containing the disk 12 rotating on shaft 14. Similarly the same plurality of record tracks 16 are shown along with transducer 18. Again the transducer 18 is shown mounted on moveable arm 20 and operated by stepper motor 22 with a projection 24 rotating around a shaft 26. Again, as illustrated in FIG. 1, physical stops 28 and 30 are mounted relative to the axis of the stepper motor 22. The stepper motor 22 couples to the control arm 20 by means of a metal band 32 which is affixed to a fixed position at one end (not shown), wrapped around the shaft 26 of the stepper motor 22, and affixed to the moveable arm 20 at point 34. It is apparent then that any rotation in stepper motor 22 will cause metal band 32 to move causing movement in moveable arm 20 and moving the position of transducer 18 relative to record tracks 16.

In order to initialize the position of the transducer 18 relative to the record track 16 a "home" track 36 is selected. The home track 36 should be selected as the record track located at one edge of the record tracks 16 or the other. Home track 36 in FIG. 2 is defined as the outside of the record tracks 16. As power is applied to the signal reproducing apparatus 10, the transducer controller may supply to the stepper motor 22 a sequence of current programs ensuring that the stepper motor 22 will move transducer 18 at least the number of record tracks 16 which corresponds to the maximum possible movement of transducer 18, or in this configuration, the number of record tracks 16 or a greater number as desired. After the transducer controller has instructed the stepper motor 22 to move transducer 18 the maximum number of record tracks 16 toward the outside of disk 12 and hence toward home track 36, it is necessary that projection 24 encounters outside stop 28 regardless of the initial position of transducer 18. This is because the stepper motor 22 has been instructed to move at least the amount of the amount of maximum of movement of transducer 18 with respect to record tracks 16. Of course, outside physical stop 28 may have been encountered by projection 24 before the maximum number of steps of stepper motor 22 has been performed. Since the amplitude of the current being supplied to the phase windings of the stepper motor is reduced from the magnitude of the current normally supplied to the phase windings of the stepper motor during this initialization process, undue impact force is avoided. Projection 24 will merely contact outside stop 28 repeatedly, and prevent the movement of transducer 18 beyond the home track when the maximum number of steps of the stepper motor 22 is finally accomplished, ending in the current program associated with home track 36, then transducer 18 will be resting on home track 36, thus providing an initialization position to the transducer controller.

While it has been noted that physical stop 28 is positioned relative to projection 24 on shaft 26 of stepper motor 22 at the approximate position corresponding to home track 36 is not necessary that this position be exact. In fact, for an 8-step stepper motor, the position of physical stop 28 could be up to three steps (tracks) beyond (or to the outside) of home track 36. With the outside physical stop 28 positioned within less than half of the total number of steps of the stepper motor 22, then the sequence of current programs delivered to the stepper motor 22 will merely cause the stepper motor 22 to move from home track 36 outwardly to contact physical stop 28 and then return again to home track 36. Since the last current program to be supplied to the stepper motor 22 will be that current program associated with home track 36, then the resulting initialized position of transducer 18 will be on home track 36. In fact, it may be desirable that physical stop 28 be positioned somewhat outside of home track 36. This is true because some apparatus for supplying current programs to the phase windings of stepper motors contain small adjustment values to account for minute expansion and/or contraction variations of the mechanical parts of the transducer positioning mechanism due to temperature changes of the signal reproducing apparatus or to a part thereof. Thus it is desirable that stop 28 be positioned at least slightly outside of home track 36 so that these minute adjustments may be accomplished in that direction without contacting stop 28.

While FIGS. 1 and 2 describe home track 36 as being the outside of the record tracks 16, just what is the "outside" track is open to definition. In one preferred embodiment all of the possible record tracks 16 are not used to record signals thereon. The outermost track or tracks may be reserved for possible scratchpad use for troubleshooting operations or for other non-data storage purposes. Since such outside track or tracks are not used for data storage, the physical stop may be located closer to such track since there is not as great a need to provide for adjustments due to temperature variations.

Throughout this discussion it has been assumed that one step of the stepper motor 22 corresponds to a movement of one of the record tracks 16. Of course, other configurations are equally possible with the stepper motor moving a half step for each record track, for example.

Figure 3:
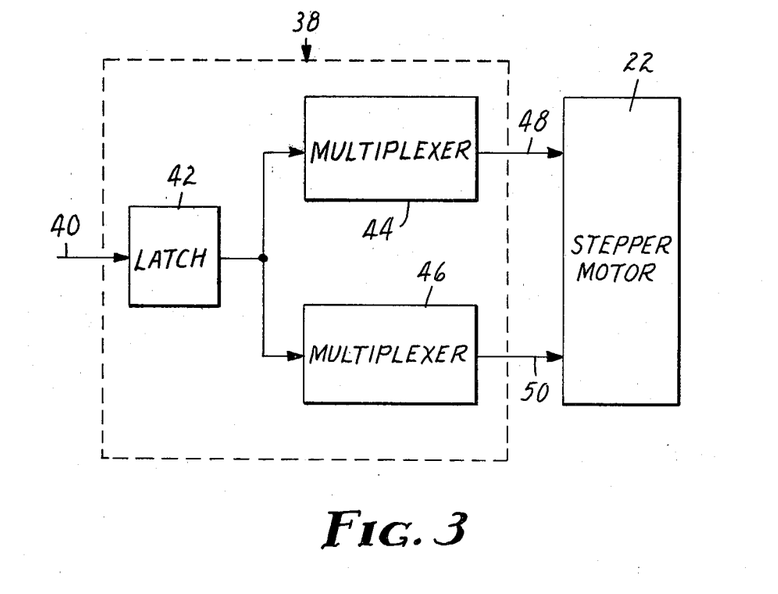
FIG. 3 is a block diagram representing the control circuitry for supplying a particular current program to the stepper motor.

FIG. 3 is a block diagram illustrating the current selector 38 utilized to supply a particular current program to the phase windings of the stepper motor 22. Current program information 40 is supplied from the transducer controller (not shown) and is captured in a latch 42. The latch 42 selects the appropriate current amplitude and polarity with the use of multiplexers 44 and 46. One multiplexer for each phase winding of the stepper motor 22 is illustrated in FIG. 3. In one embodiment, stepper motor 22 contains two phase windings. The multiplexers 44 and 46 then select the appropriate current value and polarity and send that information along signal lines 48 and 50 respectively.

The multiplexers in FIG. 3 can be used to program a "softer" current program to the phase windings of the stepper motor 22 when an initialization procedure is being utilized to position the transducer 18 to the home track 36. Generally, the phase windings of the stepper motor 22 accept either a positive, a zero or a negative current. In normal operation, the speed and precision of the operation of the stepper motor are important, and therefore, one voltage amplitude is applied to the phase windings of the stepper motor 22. In the initialization operation, speed is not important since it is only during an infrequent initialization operation. Therefore, a second and lower voltage, still corresponding to the proper polarity may be applied to the phase windings of the stepper motor 22.

Figure 4:
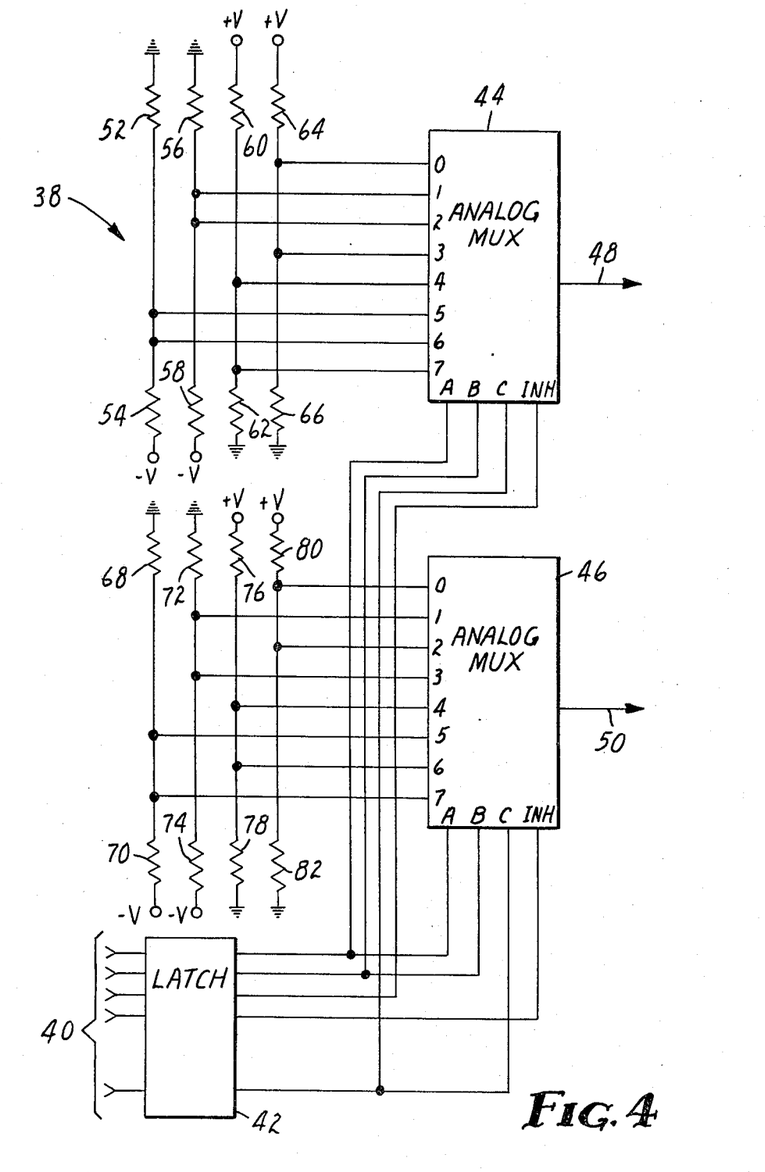
FIG. 4 is a detailed schematic program of the device in FIG. 3.

FIG. 4 represents a schematic diagam of the current selector 38 in FIG. 3. Again, in FIG. 4 the current program selection data is supplied to the current selector 38 via lines 40 from the transducer controller. The data is stored in latch 42 (MM74C175, Quad D Flip-Flop, National Semiconductor, two required). Notice that latch 42 contains 5 bits of information. Four bits of information are required to know which of the eight steps of the stepper motor the current program is to correspond. The fifth bit of information is utilized to select the initialization current programs. In the information that the current selector is to supply, the initialization program is supplied from the transducer controller. The selection information from latch 42 is coupled selectively to the selection inputs of multiplexer 44 and multiplexer 46 Z(CD4051B, Analog Multiplexer/Demultiplexer, National Semiconductor). Multiplexer 44 and 46 are eight to one analog multiplexers supplying a current program on output lines 48 and 50, respectively, to the phase windings of stepper motor 22. Each of the analog multiplexers 44 and 46 have eight analog data inputs. Coupled to the eight analog data inputs of each analog multiplexer 44 and 46 are four voltage division resistor pairs. Two of the resistor pairs for each multiplexer supply the positive and negative polarity of current during the normal transducer 18 operation and the other two supply the positive and negative polarities of current during the initialization process. The operation of the analog multiplexers 44 and 46 are inhibited when it is desired that a zero current be supplied to the phase winding. Resistors 52 and 54 supply the negative polarity current during the initialization operation to multiplexer 44 while resistors 56 and 58 supply the negative polarity normal current program to multiplexer 44. Resistors 60 and 62 supply the positive polarity initialization current program while resistors 64 and 66 supply the positive polarity normal current program to multiplexer 44. Similarly, resistors 68 and 70 supply the negative polarity initialization current program, resistor 72 and 74 supply the negative polarity normal current program, resistor 76 and 78 supply the positive polarity initialization current program, and resistors 80 and 82 supply the positive polarity normal current program to multiplexer 46. The value of the resistors supplying the initialization current program (resistors 52, 54, 60, 62, 68, 70, 76 and 78) are selected to supply a lower voltage than those resistors which supply the normal current program (resistors 56, 58, 64, 66, 72, 74, 80 and 82). An exemplary table of values for the resistors are shown in Table 1.

TABLE 1

| Reference Numeral | Component | Value |
|---|---|---|
| 52 | Resistor | 0.10 kilohms |
| 54 | Resistor | 0.681 kilohms |
| 56 | Resistor | 0.10 kilohms |
| 58 | Resistor | 0.310 kilohms |
| 60 | Resistor | 0.681 kilohms |
| 62 | Resistor | 0.10 kilohms |
| 64 | Resistor | 0.310 kilohms |
| 66 | Resistor | 0.10 kilohms |
| 68 | Resistor | 0.10 kilohms |
| 70 | Resistor | 0.681 kilohms |
| 72 | Resistor | 0.10 kilohms |
| 74 | Resistor | 0.310 kilohms |
| 76 | Resistor | 0.681 kilohms |
| 78 | Resistor | 0.10 kilohms |
| 80 | Resistor | 0.310 kilohms |
| 82 | Resistor | 0.10 kilohms |
| 84 | Resistor | 10 kilohms |
| 88 | Resistor | 1,210 kilohms |
| 90 | Resistor | 640 kilohms |
| 92 | Resistor | 301 kilohms |
| 94 | Resistor | 150 kilohms |
| 96 | Resistor | 220 kilohms |

Figure 5:
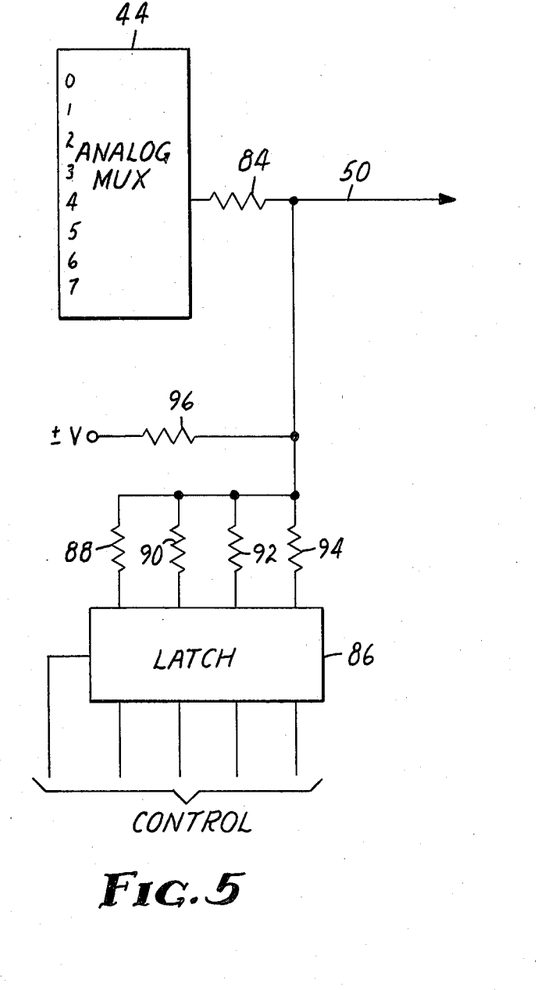
FIG. 5 is a schematic diagram of an offset circuit.

Due to expansion and contraction of the components of the transducer positioning mechanism of the signal reproducing apparatus 10, because of temperature changes, sometimes minor adjustments are desired to be made in the position of the stepper motor 22 and hence in the amplitude of the current program supplied by selector 38. Such minor adjustments can be accomplished with the circuit described in FIG. 5. FIG. 5 shows a signal 50 utilized to drive one of the phase windings of the stepper motor 22 coming from the analog multiplexer 44 of FIG. 4. However, in FIG. 5 a resistor 84 has been coupled in series between the output of the analog multiplexer 44 and the input of the phase winding of the stepper motor 22. A four-bit latch 86 (MM74C175, Quad D Flip-Flop, National Semiconductor) is shown obtaining the minute adjustment information from the transducer controller. The four outputs of the latch 86 are coupled through resistors 88, 90, 92 and 94 which are then tied together and coupled to current program line 50. Resistor 96 is coupled from current program line 50 to a voltage source. A one in one of the bit positions of the latch 86 will select the corresponding resistor 88 through 94 to be included with resistor 96 to form a voltage division of network coupled to current program line 50. This voltage division network will provide minute adjustments in the amplitude of current program line 50. If resistors 88, 90, 92, and 94 are selected to be powers of two from each other, for example, resistor 88 may be approximately 1.2 megohms, resistor 90 approximately 600 kilohms, resistor 92 approximately 300 kilohms, and resistor 94 approximately 150 kilohms. Coupled with resistor 96 at approximately 220 kilohms, and resistor 84 approximately 10 kilohms, a selection of a voltage division within a granularity of 1.2 megohms may be obtained utilizing one or more bits contained in the latch 86.

The minor adjustment latch in voltage division network for analog multiplexer 44 and current program line 50 has been described in FIG. 5. Similarly, a similar latch in voltage division network may be coupled to analog multiplexer 46 and current program line 52 to accomplish a similar position adjustment on the other phase winding of stepper motor 22.

Thus, it has been shown that the current selector described in FIGS. 3, 4, and 5, in conjunction with the physical stop illustrated in FIGS. 1 and 2 cooperate to enable the transducer controller to readily and easily initialize the position of transducer 18 to a home track 36.

Thus, it can be seen that there has been shown and described a novel initialization apparatus for a signal reproducing apparatus having a transducer scanning a plurality of record tracks and having the number of record tracks being greater than the number of steps of the stepper motor. It is to be understood, however, that various changes, modifications, and substitutions in the form of the details of the described apparatus can be made by those skilled in the art without departing from the scope of the invention as defined by the following claims.

What is claimed is:

1. A signal reproducing apparatus, comprising:
   a transducer for scanning a selected one of a plurality of parallel tracks on a record medium on which signals may be recorded,
   a stepper motor for controlling the position of said transducer with respect to said plurality of parallel tracks, said stepper motor having a plurality of steps and having a plurality of windings, each step of said stepper motor being defined by a particular current present in each of said plurality of windings, the number of said plurality of parallel tracks exceeding the number of said particular steps of said stepper motor,
   control means for controlling the movements of said transducer relative to said plurality of parallel tracks by moving said transducer a selected number of said tracks by providing a sequence of currents to said plurality of windings to effect a movement in said stepper motor,
   a physical stop positioned near one of said plurality of parallel tracks designated a home track, said physical stop for restricting the movement of said transducer from moving beyond said home track; and
   current selection means coupled between said control means and said plurality of windings for selecting between a set of high amplitude currents during normal operation and a set of low amplitude currents during initialization;
   whereby the position of said transducer may be initialized at said home track by stepping said stepper motor at least the number of said plurality of parallel tracks with said set of low amplitude currents and by ending the stepping of said stepper motor with the particular currents present in said windings associated with the particular step of said stepper motor associated with said home track.

2. An apparatus as in claim 1 wherein said parallel tracks are circular.

3. An apparatus as in claim 2 wherein said home track is located at one edge of said plurality of parallel tracks.

4. An apparatus as in claim 1 wherein said current selection means comprises:
   a control latch having a plurality of bit positions for storing movement commands from said control means to said stepper motor and having at least one bit position adapted to hold an initialize command; and
   an analog multiplexer having an output coupled to said stepper motor, having a first set of data inputs each coupled to a selected control voltage for producing said set of high amplitude currents and a second set of data inputs each coupled to a selected control voltage for producing said set of low amplitude currents and having a set of selection inputs for selecting of one of said first set of data inputs and said second set of data inputs;

said set of selection inputs being coupled to said control latch such that when said control latch holds said initialize command, that said second set of data inputs is selected;

whereby said set of said low amplitude currents may be selected when said one bit position of said latch holds said initialize command.

5. An apparatus as in claim 4 wherein said control voltages are each provided by a set of voltage division resistors coupled between a voltage source and a ground potential.

6. An apparatus as in claim 5 which further comprises:

a first resistor coupled in series between said output of said analog multiplexer and said stepper motor;

an offset latch having a plurality of bit positions each having an output coupled through an offset resistor to said stepper motor for controlling said stepper motor position by an appropriate offset determined by the contents of said plurality of bit positions; and a bias resistor coupled from said stepper motor to a voltage source for providing bias to said offset resistors.

7. An apparatus as in claim 6 wherein said offset resistors differ in value from each other by multiples of two.

8. An apparatus as in claim 1 wherein said transducer is mounted in a moveable arm, wherein said stepper motor is coupled to said moveable arm, wherein said physical stop limits the movement of said moveable arm such that when said moveable arm contacts said physical stop that said transducer is positioned approximately over said home track.

9. In a signal reproducing apparatus of the type wherein at least one transducer scans a selected one of a plurality of parallel tracks on a record medium on which signals may be recorded, wherein a stepper motor is used to control the position of said transducer, with respect to said plurality of parallel tracks, wherein said stepper motor has a plurality of windings with each step of said stepper motor being defined by a particular current present in each of said plurality of windings, wherein the number of said plurality of parallel tracks exceeded the number of said particular steps of said stepper motor, wherein control means controls the movement of said transducer relative to said plurality of parallel tracks by moving said transducer a selected number of tracks by providing a sequence of currents to said plurality of windings to effect a movement in said stepper motor, wherein a physical stop is positioned near one of said plurality of parallel tracks, designated a home track, said physical stop for restricting the movement of said transducer from moving beyond said home track, and wherein current selection means selects either a set of high amplitude currents or a set of low amplitude currents to be supplied to said plurality of windings, a method for initializing the position of said transducer at said home track, comprising:

selecting said set of low amplitude currents to be supplied to said plurality of windings;

stepping said stepper motor at least the number of steps corresponding to the number of said plurality of parallel tracks; and completing the stepping of said stepper motor with the particular currents present in said plurality of windings, associated with the particular step of said stepper motor associated with said home track.

* * * * *

UNITED STATES PATENT AND TRADEMARK OFFICE
CERTIFICATE OF CORRECTION

PATENT NO. : 4,395,742
DATED : July 26, 1983
INVENTOR(S) : Arthur Ostroff

It is certified that error appears in the above—identified patent and that said Letters Patent is hereby corrected as shown below:

Col. 8, line 32; delete the "Z" before the parenthesis.

Signed and Sealed this

Fourteenth Day of August 1984

[SEAL]

Attest:

GERALD J. MOSSINGHOFF

Attesting Officer

Commissioner of Patents and Trademarks